SHOCK ABSORBER SOLENOID

Filed Oct. 14, 1963 2 Sheets-Sheet 1

INVENTOR.
MICHAEL J. DOBES
BY Woodling, Krost, Granger and Rust
ATTORNEYS

SHOCK ABSORBER SOLENOID
Filed Oct. 14, 1963 2 Sheets-Sheet 2
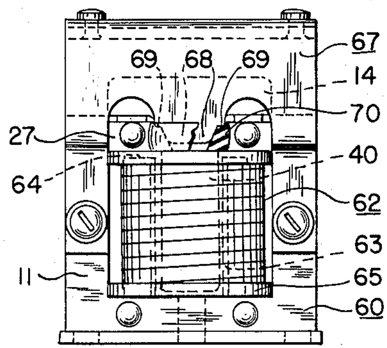
FIG. 5
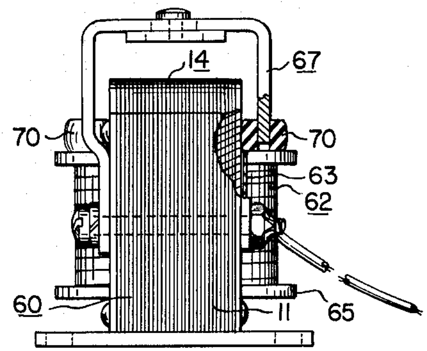
FIG. 7
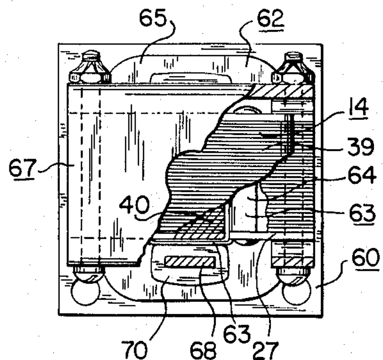
FIG. 6
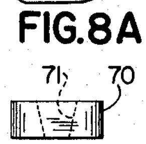
FIG. 8A
FIG. 8B
INVENTOR.
MICHAEL J. DOBES
BY Woodling, Krost, Granger and Rust
ATTORNEYS United States Patent Office 3,263,135

Patented July 26, 1966

3,263,135

SHOCK ABSORBER SOLENOID

Michael J. Dobes, Cleveland Heights, Ohio, assignor to The National Acme Company, a corporation of Ohio Filed Oct. 14, 1963, Ser. No. 315,975
15 Claims. (Cl. 317—195)

This invention relates to solenoids and, more particularly, to improvements in alternating current solenoids.

Numerous attempts have been made in prior art solenoid devices to develop solenoids which are rugged in construction and quiet in operation and have a minimum of parts. The prior art devices, however, exhibit one or more of a number of disadvantages, particularly in industrial types of solenoids. The requirements for industrial types of solenoids are particularly rigorous because they must be capable of operating tens of thousands of cycles without failure. In the prior art types of industrial solenoids, the impact of the plunger assembly upon the core assembly caused the coil assembly to vibrate due to the inertia of the coil assembly. Frequently the coil assembly would strike the yoke or coil retainer assembly with sufficient force to break the end of the bobbin of wound types of core assemblies or to crack the plastic material in which the coil was imbedded in the imbedded types of coil assemblies.

Accordingly, one of the objects of this invention is to provide a solenoid incorporating these improvements as well as others and obviating the above mentioned disadvantages.

Another object of this invention is to provide a solenoid which positively supports the plunger stem while also providing for quieter operation of the solenoid.

A still further object of this invention is to provide a solenoid which is simple in construction and includes provision for reducing the noise of the solenoid without diminishing the flux linkage between the core and the plunger.

A further object of this invention is to provide annular plastic shock absorber means mounted on portions of the yoke or retainer assembly to engage the coil and define a spring cushion for the coil to absorb the coil inertia when the plunger strikes the frame upon seating without diminishing the flux linkage between the core and the plunger.

Still another object of this invention is to provide a solenoid having improved plunger slide bearings which result in a more durable solenoid.

Yet a further object of this invention is to provide a solenoid with a shock absorber member of resilient material which is annular and has a tapering internal passage, which member engages a correspondingly tapered yoke leg terminating in a positive stop shoulder and when the member is diametrically stretched onto the yoke leg by engagement with the coil assembly, the member exerts an augmented force on the coil assembly.

Other objects, features, and advantages of this invention will be more clearly understood from a reading of the detailed description of the invention in conjunction with the accompanying drawing, in which:

FIGS. 4A, 8A and 4B, 8B are plan and elevational views, respectively, of embodiments of shock absorbers forming part of this invention;

FIG. 5 is a view, in elevation, of a preferred embodiment of push-type solenoid according to this invention;

FIG. 6 is a top view of the embodiment of FIG. 6;

FIG. 7 is a side view of the embodiment of FIG. 6;

Figure 10:
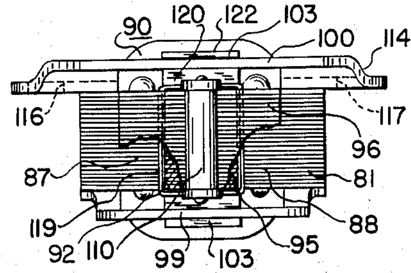
FIG. 10 is a plan view of the embodiment of FIG. 9.
Figure 9:
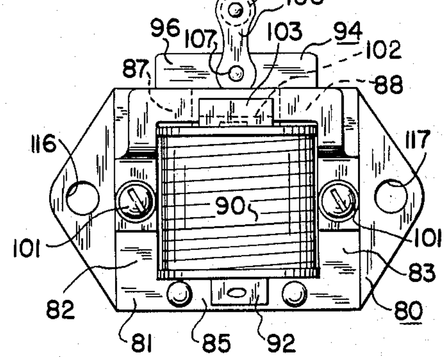
FIG. 9 is a view in elevation of an illustrative embodiment of pull-type solenoid according to this invention.
Figures 11, 12A, 12B, 12C:
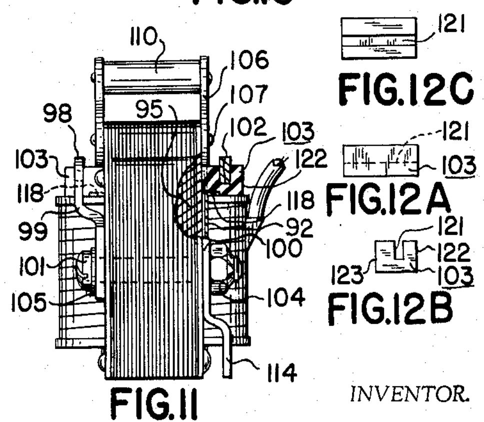
FIG. 11 is a side view of the embodiment of FIG. 9.

FIGS. 12A, B and C are elevational, side and plan views respectively of a shock absorber forming part of the embodiment of FIGS. 9, 10 and 11.

Figure 1:
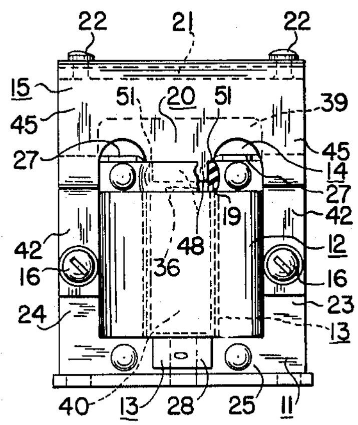
FIG. 1 is a view in elevation of one illustrative embodiment of a push-type solenoid according to this invention.
Figure 3:
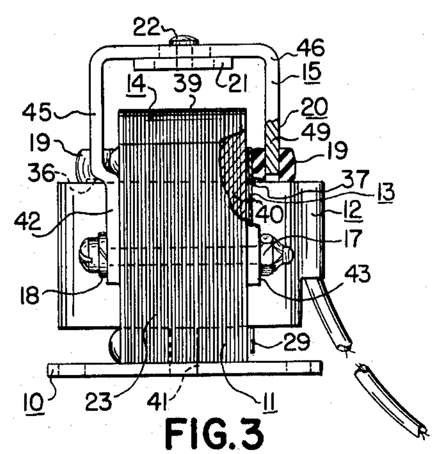
FIG. 3 is a side view of the embodiment of FIG. 1.

To illustrate the invention, FIGURE 1 of the drawing shows one example of a solenoid 10, which solenoid includes a core assembly 11, a coil 12 embedded in plastic, a coil liner 13, a plunger assembly 14 and a retainer assembly or yoke 15. The retainer assembly 15 may be held in position upon the core assembly by means of screws, such as screws 16, having elastic stop nuts 17 and lock washers 18 on the opposite ends thereof, as best seen in FIGS. 1 and 3. Advantageously, the solenoid includes a pair of resilient shock absorbers and bearing members 19 which are positioned between a leg portion 20 of the retainer assembly 15 and the coil 12 in a manner which will be subsequently described. Retainer assembly 15 also includes a pad 21 of material, such as leather, which is held by suitable rivets 22, on the inner surface of the retainer assembly, in a position to arrest the outward movement of plunger assembly 14.

The core assembly 11 is generally C shaped and has a pair of parallel arms 23, 24 and a member 25 joining a corresponding pair of ends of the parallel arms 23, 24. Opposite the member 25 is a pair of stubs 27 which project inwardly toward each other. Thus the core assembly 11 defines a path for electromagnetic flux closely linking the ends of coil 12.

The coil liner 13 is an elongated sleeve member having a substantially rectangular periphery, which member closely engages the inner surface of the coil 12 to eliminate frictional contact between the plunger assembly and the coil. The coil liner 13 is longitudinally split to prevent its being a short circuited turn secondary to the coil and to permit it to be compressed to a smaller perimeter than the internal perimeter of the coil 12 to facilitate the insertion of the coil liner within the coil. The coil liner has a pair of oppositely disposed depending members 28, 29 which depend from the smaller sidewalls 32, 33, respectively, to engage opposite surfaces of member 25 of core assembly 11 and thereby prevent transverse movement of the coil relative to the core assembly. Coil liner 13 also has a pair of ears 36, 37 struck from sidewalls 32, 33 adjacent the ends of the liner remote from depending members 28, 29. These ears 36, 37 engage the upper surface of the coil assembly 12 when the coil liner is positioned in its terminal position. As best seen in FIG. 3, shock absorbers 19 engage ears 36, 37 to prevent longitudinal and transverse movement of the liner 13. Thus the coil liner securely holds the coil assembly 12 relative to the core assembly 11 against two directions of movement.

The plunger assembly 14 is constructed of a magnetically permeable material and is preferably laminated to reduce eddy current losses. The plunger is a T-shaped member having a crossbar 39 which is larger than the opening between the stubs 27 and an elongated stem member 40 which is smaller than the opening in the liner 13. In FIG. 3 the plunger assembly 14 is shown in its closed or solenoid operated position in which the crossbar 39 rests upon the core assembly 11 and the stem member 40 is within the coil liner 13. It is understood that the plunger assembly is usually connected to a spring biased push-pin, not shown, in core hole 41 which normally retains the crossbar 39 in engagement with the absorber 21.

As best seen in FIG. 3, the retainer assembly, or yoke 15, has two pairs of legs 42, 43 which engage opposite surfaces of the core assembly 11 and are held in position by screws 16 and nuts 17. The legs 42, 43 and the connecting sides of the yoke 15 have offset portions 45, 46, respectively, which bow outwardly or away from the axis of coil assembly 12. This bowed structure increases the reluctance of the leakage flux path which links the core assembly 11 and the plunger assembly 14 through the yoke 15. Thus this bowed structure increases the effective flux for moving the plunger assembly, and permits the use of cold rolled steel or other relatively cheap material in the yoke 15. If the sides of the yoke asembly lay in planes immediately parallel and adjacent the sides of core assembly 11, they would present a low reluctance path to leakage flux unless they were of flux impermeable material, such as brass. Advantageously, the retainer assembly or yoke 15, has a pair of depending second leg portions 48, 49, one on each side of the core assembly 11 and intermediate each pair of legs 42, 43 which terminate in spaced relationship with the surface of coil 12. The retainer assembly includes a resilient shock absorber 19 in the form of an apertured grommet positioned on each of legs 20 to engage coil 12 and ears 36, 37. As shown in FIG. 1, the depending portion 48, 49 of the retainer assembly or yoke 15 is rectangular in shape and the connecting portion of yoke 15 is perpendicular to the depending portion 48, 49. Thus, the junction defines shoulders 51 against which the resilient member 19 may rest and thus be securely and compressively held between the yoke 15 and the upper surface of coil 12.

Because the retaining assembly depending members 48, 49 terminate a short distance from the top surface of coil 12 and resilient member 19 is under compression, the resilient member 19 is able to absorb the vibrations imparted to the coil 12 by the impact of the plunger assembly on the core assembly. As is known in the art, these plunger assemblies strike the core assembly 11 with considerable impact. Individual solenoids must be capable of withstanding tens of thousands of cycles of operation. Accordingly, it is an important feature of this invention to provide a coil assembly 12 with a shock absorber 19, which combination results in a solenoid suitable for industrial use. Advantageously, the sidewalls 32, 33 of coil liner 13 extend beyond the coil assembly 12 in the direction of the crossbar 39, and the shock absorber 19 engages one or both of these side wall extensions to prevent transverse movement of coil liner 13. Thus shock absorber 19 acts as a bearing for liner 13. If the ears 36, 37 are struck from the ends of sidewalls 32, 33, the shock absorbers 19 may extend through the openings thus created and engage the sides of plunger assembly 14 to act as slide guides. Because of the inertia of the coil, any freedom of coil assembly movement would cause the coil assembly 12 to strike the core assembly and the retainer assembly. In coils of the prior solenoids, this coil vibration against the retainer assembly has been known to break the bobbin end of bobbin type coil assemblies and in the embedded type coil assemblies, has been known to crack the material surrounding the coil.

Figures 4A, 4B:
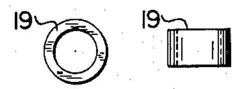

FIGS. 4A and 4B show the details of one embodiment of shock absorber 19 in which the shock absorber 19 is a cylindrical grommet and has a cylindrical aperture. This absorber may be formed of neoprene or rubber or other resilient material and may be cut from a section of hose. It is stretched transversely on mounting over the depending portion 48, and this flattens it to closely hug the depending portion 48.

Referring now to FIG. 5, there is depicted a preferred embodiment of solenoid 60 according to this invention. In this embodiment, the core assembly 11 and the plunger assembly 14 are identical to those shown in the embodiment of FIGS. 1 through 3. This embodiment includes a wound bobbin type coil assembly 62 having a coil liner 63 which terminates in a flange 64. Flange 64 is securely held between the bobbin 65 and the core stubs 27. The retainer assembly or yoke 67 is similar in shape to yoke 15 except for the intermediate leg portions 68. These leg portions 68 are tapered in the direction of coil assembly 62, as seen in FIG. 5 and join the yoke assembly in a manner to define a pair of shoulders 69. These shoulders 69 define a pair of positive stops for the shock absorbers 70, one of which is mounted on each intermediate leg portion 68.

FIGS. 8A and 8B show details of shock absorber 70. This embodiment is also a grommet and has a cross section which is elliptical, or oval, and its aperture or internal passageway 71 is tapered longitudinally of the member with a taper corresponding to that of leg portions 68 of yoke 67. When shock absorbers 70 are stretched onto the tapered leg portions 68 by the compressive force between yoke 67 and coil assembly 62, the shock absorbers attempt to regain their original shape and slide from the ends of the depending members 68. This restoring force is applied to the coil assembly to thus aid the force which opposes longitudinal compression and increases the resilient effect of the shock absorber. Thus the shock absorbers securely retain the coil assembly in position while absorbing coil assembly vibrations generated by plunger assembly 14.

Stated in another manner, the combination of the tapered surface on the depending leg member 68 and the correspondingly tapered internal surface of the resilient shock absorber provide a downward force upon the coil assembly 62 such that the coil assembly 62 is firmly retained in position. Advantageously, as best seen in FIG. 7, plunger assembly 14 is juxtaposed shock absorbers 70. These solenoids are often mounted with their coil axis horizontal. The plunger assembly slides freely in the core assembly and when horizontally mounted, the plunger assembly might engage the surfaces of the shock absorbers 70. Absorbers 70 may be made of neoprene or other suitable material which acts as a bearing material in addition to being resilient. Thus they may perform the dual functions of acting as slide bearings and as shock absorbers.

Referring now to FIG. 9, there is depicted a solenoid of the pull type embodying another example of this invention. As therein depicted, the embodiment includes a solenoid 80 having a core assembly 81 which comprises a pair of parallel arms 82, 83, a connecting member 85 connecting corresponding ends of parallel arms 82, 83 and a pair of in-turned stubs 87, 88 which stubs are connected to the legs or arms 82, 83, respectively. The solenoid 80 includes a coil assembly 90 which may be of the wound bobbin type as herein depicted, which coil assembly includes a coil liner 92. The solenoid assembly 80 includes a plunger assembly 94 which is generally T shaped and includes a stem member 95 which projects into the aperture through the coil 90 and a cross bar member 96 which is longer than the opening between stubs 87, 88. Thus the plunger cross bar 96 engages the outer surface of stubs 87, 88 when the solenoid 80 is in a closed condition.

Advantageously, this illustrative embodiment includes a retainer assembly 98 in the form of a pair of inverted U-shaped members 99, 100. These U-shaped members 99, 100 are secured to the intermediate portion of legs 82, 83 by means of a pair of screws 101, a pair of elastic stop nuts 104, and a pair of lock washers 105. Each of these U-shaped members 99, 100 has a recesss or notch such as notch 102, shown in FIG. 9 in elevation and shown in section in FIG. 11. Also advantageously, a resilient shock absorber member 103, best seen in FIGS. 12A, B and C is inserted in the notch of each of the U-shaped members and is compressively held between the U-shaped member and the coil 90. Thus shock absorbers 103 are secured against movement in all directions. The plunger assembly 94 is connected by a suitable mechanical linkage such as a link 106, which link is connected to the plunger crossbar 96 by means of a suitable pin 107. Link 106 is connected to the mechanism to be driven or operated, not shown, by means of a suitable pin 110.

Figure 2:
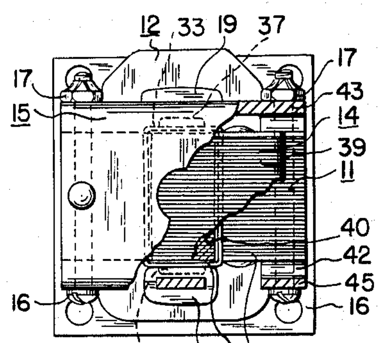
FIG. 2 is a top view of the embodiment of FIG. 1.

The coil assembly 90, the plunger assembly 94, and the core assembly 81 are substantially identical to those shown in FIGURES 1 through 3. Coil liner 92 is also substantially identical to coil liner 13 of the embodiment of FIGURES 1 through 3. The retainer assembly 98, however, is quite distinct from the retainer assemblies shown in the other embodiments in that the retainer assembly is formed in separate units, each comprising U-shaped portions because the retainer assembly is not required to limit the outward movement of the plunger assembly 94, this function being performed by mechanical means, not shown, to which the solenoid plunger assembly 94 is connected. The U-shaped member 100 is formed integrally with a mounting plate 114, which mounting plate has a pair of apertures 116, 117 for fastening the solenoid to suitable structure.

The shock absorber 103 engages ears 118 of coil liner 92 and thus holds the liner 92 and coil 90 against longitudinal movement. The shock absorber 103 also engages liner sidewalls 119, 120 to prevent transverse movement of liner 92 and coil 90. Because of this engagement between the resilient shock absorber means 103, the coil liner 92, and coil 90, the solenoid may be mounted in any position. Further, because the resilient members 103 are positioned adjacent the stem 95 of plunger assembly 94 and bulge slightly into the apertures formed in making ears 118, these resilient members may act as slide guides for the stem when the solenoid is mounted with the core axis in a substantially horizontal plane with the resilient members 103 on the top and bottom with respect to plunger stem 95.

Referring now to FIGS. 12A, 12B and 12C, there is depicted the shock absorber 103 in elevation, side view and plan, respectively. As therein depicted, the shock absorbers 103 have a substantially rectangular configuration with a longitudinal notch 121, which notch extends to a depth equal to at least half of the height of the shock absorbers. This depth, however, is not critical but should be limited to a magnitude sufficient to permit the U-shaped members 99, 100 to apply a compressive force to the members 103 when they are in position between the U-shaped members 99, 100 and coil liner 92 and the coil assembly 90. It is to be noted that notch 118 is not centered with respect to the cross section of the resilient shock absorber 103 but is positioned nearer side 122 than the side 123. With this arrangement, the side 123 is positioned adjacent the plunger stem 95 so that the surface 123 will act as a bearing guide for the plunger stem 95, and to resiliently laterally restrain the liner 92.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a solenoid comprising a laminated core assembly, including a pair of parallel arms and a member joining a corresponding pair of the ends thereof, a coil assembly including a coil between said arms and having a plunger aperture therein, a coil liner mounted on the interior of said coil, said coil liner having projections on one end thereof extending beyond said coil and having a pair of ears struck from said projections and engaging said coil, retainer means secured to said core assembly and including leg portions connected to said arms and connecting means connecting a pair of said leg portions, said retainer means including resilient means mounted on said connecting means between said leg portions and engaging said coil assembly and said ears to prevent transverse and longitudinal movement of said coil and liner relative to said retainer means, and a T-shaped plunger assembly having a stem portion slidably disposed within said coil assembly aperture and between said arms and a head portion wider than the opening between the ends of said arms.

2. In a solenoid, the combination comprising a coil assembly having a longitudinal aperture therein, a core assembly defining a flux path between the ends of said coil assembly, a coil liner inserted in said aperture and engaging one end of said coil assembly, and retainer means mounted on said core assembly and including a non-metallic resilient member resilient in a longitudinal direction and engaging and longitudinally resiliently restraining a portion of said coil liner and said one end of said coil assembly.

3. In combination, a solenoid comprising a laminated C-shaped core assembly including a pair of parallel arms and a member joining a corresponding pair of the ends thereof, a coil assembly including a coil mounted on said core assembly and having a plunger aperture therein, retainer means secured to said core assembly and including leg portions extending to a region adjacent one end of said coil, said retainer means including resilient means mounted on said leg portions and engaging and longitudinally restraining said coil assembly and a T-shaped plunger assembly having a stem portion slideably disposed within said coil assembly aperture and between said arms and a head portion wider than the opening between the ends of said arms.

4. The combination according to claim 3 wherein each of said leg portions includes portions which are substantially rectangular and terminate in a pair of shoulders and wherein each resilient means is an annular member encircling said rectangular portion and abutting said shoulders.

5. The combination according to claim 3 wherein said resilient means is a normally cylindrical member having a cylindrical passageway therethrough.

6. The combination according to claim 3 wherein said leg portions include portions which are displaced from the plane of the sides of said core assembly to increase the reluctance of the leakage flux path between said core assembly and said plunger assembly and wherein said resilient means are non-metallic.

7. The combination according to claim 3 wherein said resilient means are non-metallic and are positioned adjacent the path of said plunger assembly to act as slide bearings therefor.

8. A solenoid adapted for use in alternating current circuits comprising a laminated C-shaped core assembly including a pair of arms and an intermediate member joining said arms, an operating coil provided with an axial plunger aperture therein, yoke means disposed opposite to the ends of said arms and including first leg portions secured to opposite faces of said core assembly and second leg portions intermediate said first leg portions and terminating in the region of said coil, means for axially restraining said coil including a resilient member mounted on each of said second leg portions and engaging and longitudinally resiliently restraining said coil, and a T-shaped plunger having a stem portion slideably disposed within said coil aperture and a head portion wider than the opening between said arms and disposed between said arm ends to restrict movement of said head portion therebetween.

9. The combination according to claim 8 wherein said resilient member is an annular elastic member having a tapered aperture therethrough engaging said second leg portion.

10. A solenoid according to claim 8 wherein said second leg portions are tapered in the direction of said coil and wherein said second leg portions are connected to said yoke means to define positive stop shoulders for said resilient members.

11. The combination according to claim 10 wherein each resilient member is normally oval shaped and has a tapered passageway therethrough, each resilient member being stretched onto said second leg portions with the smaller area opening adjacent said coil and the larger area opening remote from said coil whereby said resilient member exerts a force against said coil by reason of the contraction of said resilient member and the compression of said resilient member.

12. A solenoid according to claim 8 wherein said second leg portions are substantially rectangular and are connected to said yoke means to define shoulders which limit the longitudinal movement of said resilient members.

13. In combination, a solenoid comprising a laminated core assembly, including a pair of parallel arms and a member joining a corresponding pair of the ends thereof, a coil assembly including a coil between said arms and having an aperture therein, retainer means including a pair of inverted U-shaped portions and resilient means secured between a portion of each of said U-shaped portions and said coil assembly to act as shock absorbers for said coil assembly, and plunger means having a stem portion in said coil aperture and a substantially perpendicular crossbar portion which engages said core assembly.

14. The solenoid according to claim 13 wherein said U-shaped members have a shock absorber retaining notch therein, said absorbers being mounted in said notches.

15. The solenoid according to claim 13 wherein each of said resilient means has a notch therein, said notch engaging said U-shaped members.

References Cited by the Examiner

UNITED STATES PATENTS

| | | | |
|---|---|---|---|
| 2,665,397 | 1/1954 | Jencks | 317—195 X |
| 2,899,609 | 8/1959 | Andrews | 317—191 |
| 2,977,438 | 3/1961 | Morschel. | |
| 3,017,547 | 1/1962 | Jencks | 317—165 X |
| 3,179,859 | 4/1965 | Ray et al. | 317—195 X |
| 3,195,024 | 7/1965 | Conrath | 317—191 |

BERNARD A. GILHEANY, *Primary Examiner.*

JOHN F. BURNS, *Examiner.*

G. HARRIS, Jr., *Assistant Examiner.*